Patented Sept. 12, 1933

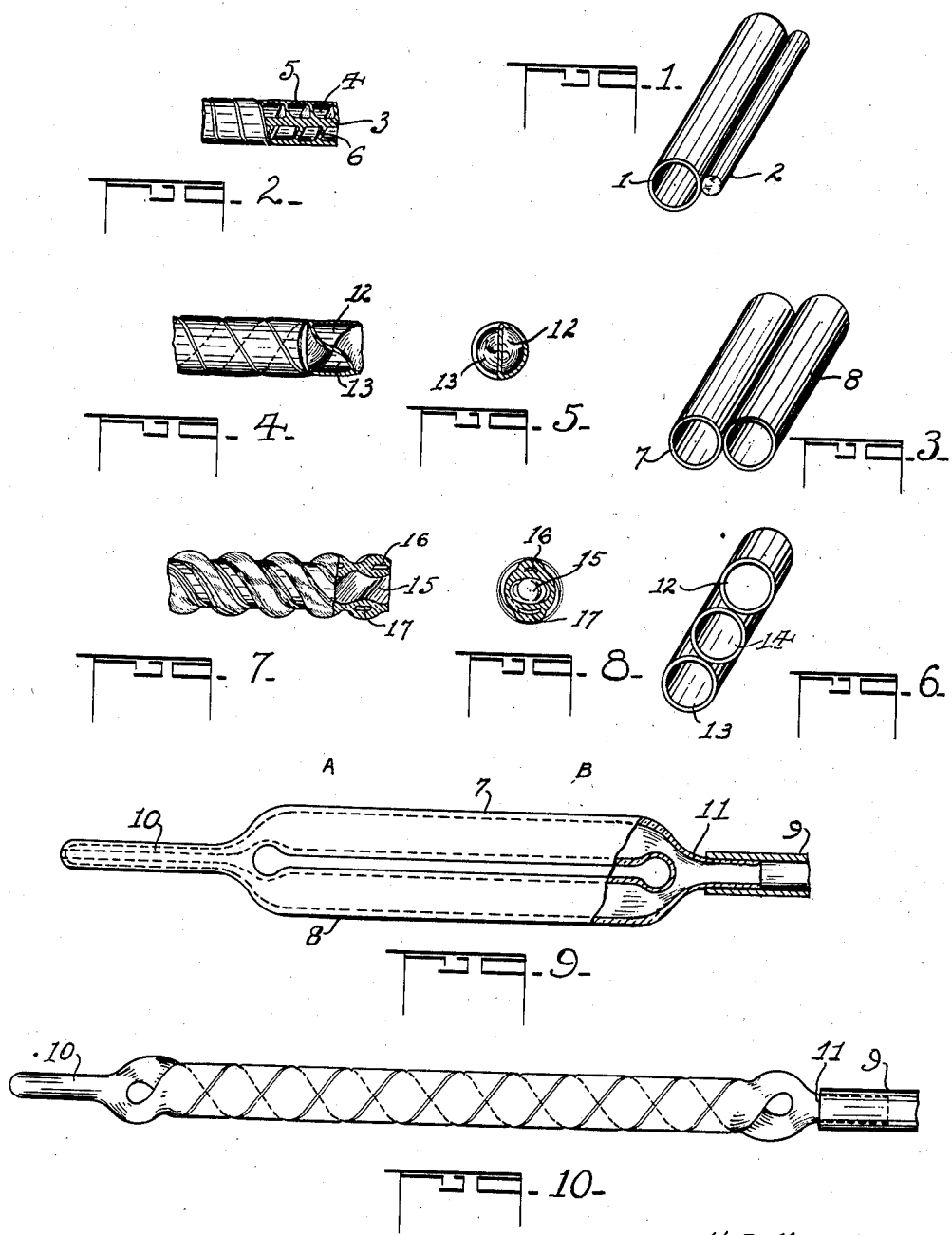

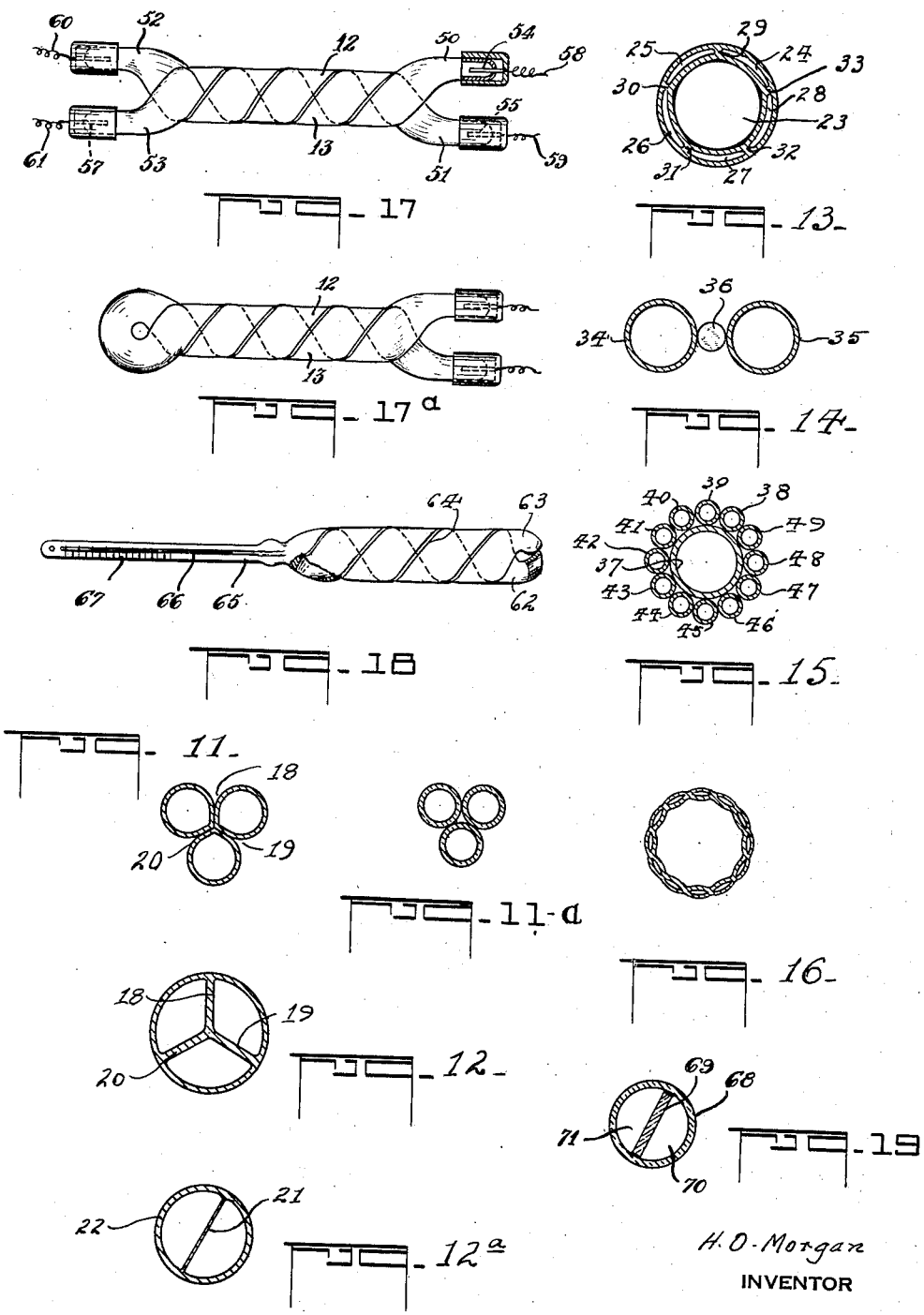

1,926,552

UNITED STATES PATENT OFFICE 1,926,552

TUBULAR STRUCTURE AND METHOD OF MANUFACTURE THEREOF

Hans Otto Morgan, Ridgefield Park, N. J.

Application April 14, 1932. Serial No. 605,161

20 Claims. (Cl. 49—79)

This invention relates to tubular structures, and with particularity to twisted or intertwined tubular structures.

While the invention finds its greatest applicability to glass tubular structures, it will be understood that the invention in its broad aspects is not limited to glass structures, but is susceptible of embodiment in any other material which is capable of being worked in the manner set forth herein.

One of the principal objects of the invention is to provide a method of making a convoluted, twisted or intertwined tubular member.

Another object of the invention is to provide a method of making a spiral bore convoluted, twisted or intertwined tubular body.

Another object is to provide a twisted vitreous body or rod having a convoluted bore therethrough.

Another object is to provide a glass body with a helically convoluted bore therethrough.

A further object is to provide a vitreous body or rod with a plurality of co-axial helical bores therethrough.

While various proposals have heretofore been made looking toward the manufacture of multi-bore glass tubes or rods, in all cases these tubes have had substantially straight or parallel bores. Accordingly, it is one of the outstanding features of the present invention to provide a plural bore glass or other vitreous body wherein the bores are coextensive in length and intertwine each other interiorly of the body, much in the same manner as a multiple threaded member.

Another feature of the invention resides in the manner of making a bi-part glass or similar vitreous structure having a dividing wall sufficiently thin to enable it to flex or transmit pressure variations similar to a rubber diaphragm.

Another feature relates to an improved form of barometer employing a plural bore glass tube.

A further feature resides in the provision of a plural bore glass tube suitable for use in any type of pressure responsive instruments.

A further feature relates to the novel method of making tubular glass bodies.

A further feature relates to a multi-bore glass or vitreous body having the sections intertwined or braided.

A still further feature relates to a novel form of lamp having a plurality of intertwined convoluted or twisted luminescent chambers.

Other features and advantages not specifically enumerated will be apparent after a consideration of the following detail descriptions and the appended claims.

For the purpose of explanation the invention will be disclosed hereinafter as applied to a simple straight tubular structure. However, it will be understood that the invention can be utilized in different forms of tubular structure such as spiral, helical or the like, without departing from the spirit and scope of the invention.

Referring to the drawings,

Fig. 1 is a perspective view for the purpose of explaining the manner of making a tube having a single convoluted bore;

Fig. 2 is a view, partly in section, of a tube having a single convoluted bore;

Fig. 3 is a perspective diagram to explain the method of making a double bore tube with each of the bores convoluted;

Fig. 4 is a view, partly in section, of a double bore tube;

Fig. 5 is an end view of the tube of Fig. 4;

Fig. 6 is a perspective view to explain the method of making a triple convoluted bore tube;

Fig. 7 is a view, partly in section, of a triple convoluted bore tube;

Fig. 8 is an end view of the tube of Fig. 7;

Fig. 9 is a view, partly in section, to explain the steps and the method of making the tubular structures according to the invention;

Fig. 10 shows the structure of Fig. 9 after it has been treated according to the invention;

Fig. 11 is a cross sectional view of a tri-bore tube similar to the tube of Figs. 7 and 8, but with the common walls not integrally fused;

Fig. 12 is a cross sectional view of another form of tri-bore tube according to the invention;

Fig. 13 is a sectional view of a tubular structure having an enlarged central bore and five peripheral bores;

Fig. 14 is a view for the purpose of explaining an alternative method of making a double bore tube;

Fig. 15 is a sectional view of a tube similar in general to the tube of Fig. 13, but with the individual tube sections preserved in their original cross section;

Fig. 16 illustrates a modification of the structure of Fig. 13;

Fig. 17 shows a lamp embodying features of the invention;

Fig. 18 shows a pressure responsive instrument such as a barometer or the like embodying features of the invention.

Referring more particularly to Figs. 1 and 2, a description will now be given of the method of making a tube having a single convoluted continuous bore therethrough. The process of making this tube comprises the positioning of a hollow tube 1 adjacent a solid rod 2. Preferably the members 1 and 2 are of glass or other vitreous material which is capable of being fused and expanded by air pressure, although it will be understood that the invention is not limited to glass but is capable of use with any other material having the properties of fusing and expanding under pressure. Preferably, although not necessarily, the rod 2 is of smaller diameter than the tube 1. The members 1 and 2 may be held in contact throughout their length or they may be spaced apart. After being thus positioned the members 1 and 2 are subjected to heat throughout a portion of their lengths sufficiently to tend to cause the wall of tube 1 to collapse. At the same time air under pressure is blown into the tube 1 to prevent collapse thereof. The degree of heat that is employed may be regulated in accordance with the shape of the final product desired. That is to say, sufficient heat may be applied merely to fuse the wall of the tube 1 without causing integral union between the material of the tube 1 and the material of the rod 2. In this case the air blowing through the tube 1 will not materially deform the cross section of the said tube, but of course by suitably choosing the fusing temperature and the pressure of the air, any desired shape may be given to the tube 1.

While both the heat and air are being applied a relative twisting motion is made between the members 1 and 2. At the same time preferably, although not necessarily, the members 1 and 2 are subjected to a tensile force to reduce the outside diameter of the finished product. It has been found that by thus heating the member 1 to the fusion point, or at least to its collapsing point, at the same time exerting air pressure inside the tube and twisting the same, upon cooling, a product such as shown in Fig. 2 results wherein there is a central solid portion 3 and continuous hollow portion or bore 4, which is helically convoluted with respect to the portion 3. The thickness of the portion 3 may be controlled by choosing the proper temperature. That is to say, if the temperature is chosen so that the rod 2 tends to flow or fuse integrally with the tube 1, then the solid portion 3 of the final product tends to become of smaller size, and its size may be further controlled by the air pressure and the degree of twist. It will be obvious of course that the invention is not limited to any particular degree of twist, this being purely a matter of choice. Similarly by properly regulating the heat and pressure that is applied to the tube 1, the thicknesses of the walls 5 and 6 may be acurately controlled.

When the heat is such as to cause the members 1 and 2 to wet each other or fuse together, the final product resulting from the twisting as illustrated in Fig. 2 is very rigid, notwithstanding that the interior walls 6 may be relatively very thin. This results from the fact that the two portions 1 and 2 are worked together into a substantially homogeneous structure at the same time that the continuous bore is maintained by the air pressure notwithstanding that the two members 1 and 2 are twisted relatively to each other. The final result therefore is a tubular member which has a single helically convoluted bore 4, the inner wall 3 being substantially provided by the original rod 2, while the walls 5 and 6 are substantially provided by the original tubular member 1.

It will be obvious, of course that the finished product of Fig. 2 may be given any shape by subsequent treatment. In other words, any method of shaping an ordinary straight bore tube may be applied to the convoluted bore tube of Fig. 2, thus the finished product of Fig. 2 may be worked by ordinary glass working processes to a spiral, helical or other curved shape instead of a simple straight shape as shown.

Referring to Figs. 3, 4, 5, 9 and 10, a description will now be given of the method of making a double bore tube wherein each of the bores is helically convoluted with respect to the axis of the tube proper. In this embodiment the process is substantially the same as that above disclosed in connection with Figs. 1 and 2. However, it is necessary in this embodiment to replace the rod 2 by a hollow tube. Thus Fig. 3 shows two hollow tubes placed adjacent to each other prior to the heating and twisting operations. As described above in connection with Fig. 1, the tubes 7 and 8 may be in contact throughout their length, or they may be spaced a slight distance from each other, as shown in Fig. 9. It will be understood that Fig. 9 represents one manner of connecting the tubes 7 and 8 to a common source of air pressure. In this embodiment the tubes 7 and 8 have their right hand ends tapered and are fused together so that they may be connected to a common source or conduit 9. The left hand ends of the tubes 7 and 8 may be similarly tapered and closed if desired to provide a handle for twisting the tubes around each other. With the tubes 7 and 8 thus connected to a source of air pressure through the conduit 9, the said tubes are heated throughout a portion of their length, for example between the points A and B to a temperature sufficient to tend to collapse the walls of the said tubes. However, the air pressure through the conduit 9 prevents this collapse and retains the tube walls in their original shape or in any other desired shape depending upon the temperature employed and the air pressure employed. When the tubes 7 and 8 have been raised to the desired temperature to soften them to the desired extent, the heated section is twisted, for example by holding the end 10 stationary and turning the end 11 which upon cooling results in a structure such as shown in Fig. 10. The tube of Fig. 10 is shown partly in longitudinal section in Fig. 4, and in end section in Fig. 5, and has in fact two entirely separate bores 12 and 13 both of which are helically convoluted with respect to the longitudinal axis of the tube.

Instead of applying the air pressure simultaneously with the application of heat to soften the walls of the tubes 7 and 8, the air pressure may be applied as a subsequent operation. That is to say the tubes 7 and 8 may be heated to just sufficient temperature to cause their walls to soften so that they may be twisted relatively to each other without causing them to collapse or fuse integrally with each other. When the desired twist has been given the tubes may be allowed to cool to assume their rigid shape. The result of this latter procedure, therefore, is to provide in effect two entirely separately tubes which are twisted about each other to provide convoluted bores. This same double tube may subsequently be heated to a sufficiently high temperature to cause the tube walls to wet each other or fuse together at the same time that air pressure is applied to prevent their collapse. This results in a more homogeneous structure, and in effect produces a single tube such as shown in Figs. 4 and 5 with a double internal convoluted bore.

It will be understood of course that during the foregoing operations of heating and twisting, the tubes 7 and 8 may be given any desired degree of pull so as to reduce the overall diameter of the finished product, and at the same time increase its length.

It will also be understood that instead of subjecting the softened tubes during twisting to a simple pull, alternate compressions and tensions may be applied, as is well known in the glass working art, to enhance the homogeneity and uniformity of the finished product.

It will also be understood that well known glass blowing technique may be applied during the formation of the double bore tubes above described, and preferably, although not necessarily, both tubes are subjected to a uniform heat over their entire surfaces during the twisting operation. Of course, if peculiar shapes are desired this heating may be localized at particular points so as to produce the desired shape in the twisted structure, as will be obvious to those skilled in the glass blowing art.

The foregoing procedure may be utilized in the production of a tube having any number of convoluted or intertwined bores. For example, when it is desired to make a tube having a triple convoluted bore, the operation is started with three tubes, 12, 13, 14, as illustrated in Fig. 6. The three tubes are positioned either in contact or slightly separate from each other, and are subjected to a heating and twisting operation as above described, resulting in a finished tube shown in longitudinal cross section in Fig. 7, and in end view in Fig. 8, having three separate bores 15, 16 and 17. From an inspection of this figure it will be noted that the three tubes have been heated to sufficient temperature to cause their common walls to fuse or integrally unite and that the three bores are in uniform cross section throughout their length.

However, this is merely a matter of glass blowing technique, and if it is desired to produce a triple bore tube with bores substantially uniform throughout their length, this may be done merely by heating the three tubes to their fusing point so that they are sufficiently soft to enable them to be twisted about each other. At the same time reliance may be placed upon the air pressure to preserve the proper cross section of the tubes during the twisting operation. It will also be understood that instead of connecting the three tubes to a common source of air pressure, each tube may be connected to an individual source so that the resultant cross section of the bores in the finished tube may be given any desired shape independently of each other. Thus Fig. 11 represents a cross section of a triple bore tube produced from the three tubes of Fig. 11ª, the tubes having been heated to just sufficient temperature to cause them to soften whereby they may be twisted without causing the common walls 18, 19 and 20 to wet or integrally unite with each other, thus preserving substantially the original cross section of the tubes even in their resultant twisted shape. Furthermore, it will be understood that instead of applying tension to reduce the outside diameter of the finished prdouct, reliance may be placed upon the air pressure to increase the outside diameter of the finished product to any desired extent. Furthermore, any well known method of controlling the outer shape of the finished tube may be employed. For example, after the three tubes have been twisted to provide the structure such as shown in Fig. 7 or in Fig. 11, these tubes may be reheated and inserted in a suitable preheated tubular mold and subjected to air pressure so as to mold the outer periphery of the finished twisted tube.

Fig. 12 shows a triple bore tube produced by heating and twisting the three tubes of Fig. 6. In this embodiment, however, the heating is preferably carried to such an extent that the common walls 18, 19 and 20 are integrally fused and the simultaneous air pressure through the tubes is such as to expand outwardly the common wall portions to a substantially circular shape. Here again, instead of applying the air pressure from a common source to the separate tubes, individual sources of air pressure may be employed to control the shape of the three bores in the resultant product.

The last mentioned procedure may also be applied to the two tube idea. That is to say, the heat and pressure may be such as to cause the common walls of the two tubes to integrally unite to form in effect a single transverse wall 21 (Fig. 12ª) and with the two tubes forming a single continuous circular outer wall 22. It has been found that by regulating the temperature of the air pressure the transverse wall 21 may be given any desired thickness. As a matter of fact, the wall 21 has been reduced to the "color line" thickness, this wall then exhibiting the properties of rubber having exceptional elasticity enabling the tube to function as a pressure responsive instrument even after the glass is cooled. It has also been found that this interior or transverse wall 21 may be reduced to the color line thickness without correspondingly reducing the thickness of the outer wall 22. Thus a tube having a plurality of internal bores separated by an almost imponderable diaphragm can be produced and the uses for this type of tube are very many, two typical uses being illustrated in Figs. 17 and 18, described hereinbelow.

From the foregoing description it will be seen that by starting with the proper number of tubes, by suitably regulating the working temperature during the twisting operation, and by suitably regulating the blowing air pressure, any desired structure may be produced. Thus Fig. 13 shows a finished tube having an enlarged central bore 23 and a set of five peripheral bores 24, 25, 26, 27, 28, all of these bores being separated from each other throughout their entire length by the transverse walls 29, 30, 31, 32, 33. The tube of Fig. 13 may be produced by positioning originally five smaller tubes around a larger tube corresponding to the bore 23. This assembly may then be heated and twisted as above described at the same time that air is blown through the tube 23, and through the peripheral tubes, thus maintaining the formation of the central tube 23 and producing the formation of the peripheral tubes as shown in Fig. 13. Here again the individual pressures through the peripheral tubes and the temperatures may be chosen in accordance with the shape of the bores that is desired.

Fig. 14 shows an alternative method of producing a double bore tube. In this embodiment the process is started by using two separate tubes 34 and 35, together with an intermediate solid glass rod 36. These three members are then heated to the desired temperature at the same time that air is blown through the tubes 34 and 35, and the said tubes twisted relatively to each other and to the rod 36. Depending upon the temperature employed and the air pressure employed, the double bore tube may be given any desired cross section as will be obvious to those skilled in the glass blowing art. Here again the tubes 34 and 35 may be connected to individual sources of blowing pressure to control the shape of the final bores as may be desired.

Fig. 15 shows a cross section of a twisted tube having a central bore 37 and a series of peripheral bores 38 to 49 inclusive. This tube is produced in general similarly to the tube 13 with this difference however that the temperature during the twisting operation is not high enough to cause the common walls to fuse together so that upon blowing a structure similar to Fig. 13 is produced, but rather the temperature is such as to merely soften the individual tube walls that they may be all twisted relatively to each other without substantially deforming their cross section. Preferably however the temperature is such as to firmly fuse the individual tubes together so that the resultant twisted product is a rigid and self-supporting structure.

Fig. 16 is intended to represent a tube similar to that of Fig. 15 with the exception however that the temperature during the twisting operation has been sufficiently high to cause the tube walls to fuse or integrally unite. It will be understood of course that in the various Figs. 11 to 16 inclusive the tubes are represented in their twisted cross section merely for the purpose of securing simplicity in the drawing. One of the main fields of usefulness of the twisted tube produced in accordance with the foregoing descriptions is in the lamp art. For example, there is shown in Fig. 17 a gaseous discharge lamp embodying a twisted tube similar to that for example of Fig. 4. In this figure the two bores 12 and 13 terminate at opposite ends in the separate tubular portions 50, 51, 52, 53. Suitable electrodes 54, 55, 56, 57 are mounted in the ends of the respective tubes and are provided with lead-in wires or conductors 58, 59, 60, 61. The tubular portions 50, 51, 52, 53 are of course sealed off at their ends in the manner well known in the gaseous discharge tube art, it being understood that each of these tubes is provided with a filling of a suitable gas such as neon, argon, or the like, so that when a suitable source of potential is connected to the various electrodes the gas in the separate tubes may be rendered luminous. For example, the gas in one tube may be neon and in the other tube may be mercury, giving a very artistic and pleasing effect to the finished lamp. Of course, instead of bringing out the bores 12 and 13 to separate terminals at each end the bores at one end may be closed as illustrated schematically in Fig. 17ª, and a single pair of lead in terminals and electrodes provided at the opposite ends.

As hereinabove described, the dividing wall between the tubular sections may be made of extreme thinness and actually of color line thickness so that the said wall exhibits the properties of an elastic material, thus enabling the invention to be applied to any type of instrument which is pressure responsive. Merely for purposes of illustration there is shown in Fig. 18 how the invention can be applied to a barometer. In this figure the usual barometer bulb is replaced by a double twisted tube similar to the tube of Fig. 12ª. That is to say the bulb comprises two tubular portions 62 and 63 twisted about each other and separated by a substantially imponderable diaphragm 64. One of the tubular portions 62 for example, is left open at its lower end so that pressure of the atmosphere can act directly on the diaphragm 64. The other tubular portion 63 is closed at its lower end and terminates at its upper end in the tubular member 65 having a very fine bore 66 similar to the ordinary thermometer or barometer construction. A quantity of mercury or other similar liquid is then placed within the bore 63. Consequently the bore 63 functions similar to the ordinary thermometer bulb and the pressure of the atmosphere or other medium whose pressure is to be determined acts on the diaphragm 64 and transmits this pressure to the mercury within the tubular portion 63, thus causing the mercury to rise within the bore 66. A suitable scale 67 is provided on the end of the portion 65 in accordance with standard practice. By this arrangement therefore a much greater surface area is provided for the action of the air pressure, and it is possible to make the diaphragm 64 extremely thin. This diaphragm may be made of a thinness of the order of gold leaf or even of color line thinness so that the instrument is capable of registering extremely minute pressure variations.

Obviously of course the basic idea of Fig. 18 is not limited to use in barometers, but is capable of embodiment in thermometers and other types of pressure responsive instruments, the fundamental idea being the replacement of the ordinary pressure bulb with a twisted tubular bulb having a substantially imponderable diaphragm which responds to the pressure to be measured.

Various changes and modifications may be made herein without departing from the spirit and scope of the invention. For example, instead of practising the invention by using two entirely separate tubes as shown for example in Fig. 3, and twisting these tubes relatively to each other, the equivalent may be obtained by inserting in a single tube throughout its length a diaphragm, then joining the diaphragm to the tube throughout its length. For example, as shown in Fig. 19, the glass tube 68 may have positioned therein throughout its length a glass strip 69. The strip 69 may be fused at its longitudinal edges to the wall of the tube 68, so as to form in effect a single tube having two semicircular bores 70 and 71. Thereupon the unitary tube may be heated and twisted as described in connection with Figs. 1 and 3, at the same time that air pressure is applied through the two portions 70 and 71.

What is claimed is:

1. The method of making a tubular structure which includes the step of convoluting a hollow tubular member about another member, and fusing portions of said members together to form a rigid unitary structure.

2. The method of making a tubular structure which includes the steps of convoluting two bodies about each other, at least one of said bodies being a hollow tubular member, applying pressure interiorly of the tubular member during the convoluting operation, and fusing portions of said member together.

3. The method of making a tubular structure which includes the steps of convoluting a hollow tubular member about another member, applying an expansive pressure interiorly of said hollow member during the convoluting operation, and fusing portions of said members together.

4. The method of making a tubular structure having a convoluted bore which includes the steps of positioning a hollow tubular member adjacent length wise to a rod-like member, twisting said members about each other, and applying an expansive pressure interiorly of the hollow member simultaneously with the twisting thereof.

5. The method of making a tubular structure having a convoluted bore which includes the steps of applying heat to a tubular member to soften the walls thereof, convoluting said member about another member, applying an expansive force interiorly of said tubular member simultaneously with the convoluting thereof, and fusing portions of said members together.

6. The method of making a body with a convoluted bore which includes the steps of twisting a hollow tubular member about a cylindrical member, subjecting the interior face of said hollow member to an expansive pressure during the twisting operation, and fusing portions of said members together to form a rigid unitary structure.

7. The method of making a vitreous body having a convoluted bore which includes the steps of heating a vitreous body to soften the wall thereof, convoluting said tube while softened about another member, and fusing said member to said body.

8. The method of making a glass body having a helical bore which comprises heating a glass tube to soften the walls thereof, applying air pressure interiorly of said tube, simultaneously twisting said hollow tube about another member, and fusing said tube to said member.

9. The method of making a vitreous body having a helical bore which comprises positioning a tubular vitreous member adjacent another vitreous member, heating both said members while in contact to render them plastic and to unite them integrally, applying air pressure to the interior of the hollow member, and simultaneously twisting said members relatively to each other.

10. The method of making a glass body with a single helical bore which comprises positioning a glass tubular member lengthwise adjacent to a rod-like member, heating both said members to fasten them together, and twisting said members relatively to each other.

11. The method of making a glass body with a helical bore which comprises positioning a glass tube lengthwise adjacent a glass rod, heating the tube and the rod to soften them, and twisting the member and the rod relatively to each other to bond them together.

12. The method of making a glass body with a helical bore which comprises positioning a glass tube adjacent a glass rod, heating the tube and the rod to the fusion point to cause said tube and rod to bond together, applying air under pressure interiorly of the tube, and simultaneously twisting the tube and the rod relatively to each other.

13. The method of making a glass body having a helical bore therethrough which comprises positioning a glass tube adjacent lengthwise to another glass tube, heating portions of both said tubes to soften the walls thereof and bond the tubes together and twisting said tubes relatively to each other.

14. The method of making a glass body having a plurality of separate helical bores therethrough which comprises positioning a pair of glass tubes lengthwise adjacent to each other, heating said tubes to soften the walls thereof and bond the tubes together, twisting the tubes relatively to each other and subjecting at least one of said tubes to air pressure on the interior thereof during the twisting operation.

15. The method of making a glass body having a plurality of helical bores therethrough which comprises positioning a pair of glass tubes lengthwise adjacent to each other, heating said tubes to soften the walls thereof and bond the tubes together, and convoluting one tube about the other.

16. The method of making a glass body having a plurality of helical bores therethrough which comprises positioning a pair of glass tubes lengthwise adjacent to each other, subjecting said tubes to heat to cause the adjacent portions to fuse together, convoluting said tubes about each other, and applying air pressure to the interior of at least one of said tubes during the convoluting operation.

17. The method of making a glass body having at least three separate helical bores extending therethrough which comprises positioning three glass tubes lengthwise adjacent to each other, heating said tubes to soften the walls thereof and bond the contacting surfaces together and convoluting all of said tubes about one another.

18. The method of making a glass body having at least three separate and continuous helical bores extending therethrough which comprises positioning three glass tubes lengthwise adjacent to each other and in contact, heating said tubes to soften the walls thereof and cause the contacting surfaces to bond together, convoluting said tubes relatively to one another during heating, and subjecting the interior of at least one of said tubes to air under pressure during the convoluting operation.

19. As a new article of manufacture a glass tube having on the interior thereof a helically grooved member with the edges of the grooves integrally united to the inner wall of the glass tube defining a single continuous helical bore through said tube.

20. The method of making a body with a convoluted bore which includes the steps of twisting a hollow tubular member about a cylindrical member, softening the walls of the hollow member during the twisting operation to cause the said walls to fuse to the cylindrical member and applying air under pressure to the interior of said hollow member during the twisting operation.

HANS OTTO MORGAN.